United States Patent [19]

Simin

[11] Patent Number: 5,150,939
[45] Date of Patent: Sep. 29, 1992

[54] SWING-OUT TAIL LAMP

[75] Inventor: Gerald L. Simin, Holly, Mich.

[73] Assignee: General Motors Corporation, Detroit, Mich.

[21] Appl. No.: 818,947

[22] Filed: Jan. 10, 1992

[51] Int. Cl.$^5$ .............................................. B60R 5/00
[52] U.S. Cl. ............................ 296/37.1; 296/37.16; 280/166
[58] Field of Search .................. 296/37.1, 37.16, 76, 296/195; 224/42.42; 410/37

[56] References Cited

U.S. PATENT DOCUMENTS

| | | | |
|---|---|---|---|
| 2,576,385 | 11/1951 | Bigsby | 296/37.1 |
| 2,795,363 | 6/1957 | Turner | 224/42.43 |
| 2,901,285 | 8/1959 | Walker | 296/37.1 |
| 4,361,355 | 11/1982 | Wise et al. | 296/37.1 |

FOREIGN PATENT DOCUMENTS 1092316 11/1960 Fed. Rep. of Germany.

Primary Examiner—Robert R. Song
Attorney, Agent, or Firm—Edward J. Biskup

[57] ABSTRACT

A swing-out tail lamp for a vehicle providing access to the trunk compartment while the trunk lid is closed and being characterized by having the tail lamp supported along one side thereof by a hinge connected to the vehicle that allows the tail lamp to be moved from a closed position to an open position. The tail lamp is combined with a latch mechanism which serves to secure the tail lamp assembly to the vehicle when located in the closed position, and a spring detent is provided to maintain the tail lamp assembly in the open position.

10 Claims, 1 Drawing Sheet

SWING-OUT TAIL LAMP

The present invention relates, in general, to vehicle lamp assemblies and more particularly to a swing-out tail lamp that allows the trunk lid of a vehicle to close when carrying cargo that extends out of the trunk compartment.

BACKGROUND OF THE INVENTION

Generally, almost all trunk compartments of vehicles have a trunk lid that opens and closes vertically so that, when in the closed position, a portion of the trunk lid is located adjacent a high rear end panel provided with fixed tail lamps. The space in such trunk compartments is limited in longitudinal length, and therefore, when it is desired to carry excessively long articles, the articles must extend out of the trunk compartment. To accomplish this, the trunk lid of the trunk compartment must be secured in the open position in some manner. Although such long articles can be accommodated by having the trunk lid in the open position, an additional problem is presented in that the high rear end panels can make it difficult to load and unload the trunk compartment.

SUMMARY OF THE INVENTION

The present invention solves the above problem by providing a swing-out tail lamp that pivots outwardly so as to allow excessively long articles to extend out of the trunk while the trunk lid remains closed. The swing-out feature of the present invention, in effect, also allows for the partial removal of the conventional high rear end panel so as to facilitate loading and unloading of the trunk compartment. An additional feature of the present invention is the conventional operation and visibility of the "stop light-turn signal" warning of the swing-out tail lamp assembly when in the open position.

In the preferred form, the present invention forms a part of a vehicle having a trunk compartment comprised of a trunk lid, a pair of side walls, a floor, and a pair of tail lamp assemblies one of which is fixed, and the other of which is adapted to pivot and move outwardly into an open position so as to provide access to the trunk compartment while the trunk lid is closed. The movable tail lamp assembly is connected to the vehicle by a hinge which allows the tail lamp assembly to pivot about a substantially vertical axis between a closed position and an open position. When in the closed position, the movable tail lamp assembly cooperates with the fixed tail lamp assembly to provide a major portion of the rear end panel of the trunk compartment. A latch mechanism, located inside the trunk compartment, serves to secure the movable tail lamp assembly to the rear end panel when in the closed position, and a spring detent serves to maintain the tail lamp assembly in the open position. When in the open position, a lens located at the free end of the tail lamp assembly permits the latter to continue to function as a conventional tail lamp assembly that provides a "stop light-turn signal" warning to following vehicles.

To this end, the objects of the present invention are to provide a new and improved tail lamp assembly that is pivotally connected to a vehicle and pivots outwardly so as to allow long articles to be placed into and extend out of the trunk compartment while the trunk lid remains closed; to provide a new and improved tail lamp assembly that is pivotally carried by a vehicle and pivots outwardly to facilitate loading and unloading of the trunk compartment; and to provide a new and improved tail lamp assembly that is pivotally connected to a vehicle so as to pivot outwardly and still provide a "stop light-turn signal" warning to following vehicles when the tail lamp assembly is in the open position.

DESCRIPTION OF THE PREFERRED EMBODIMENTS

Figure 1:
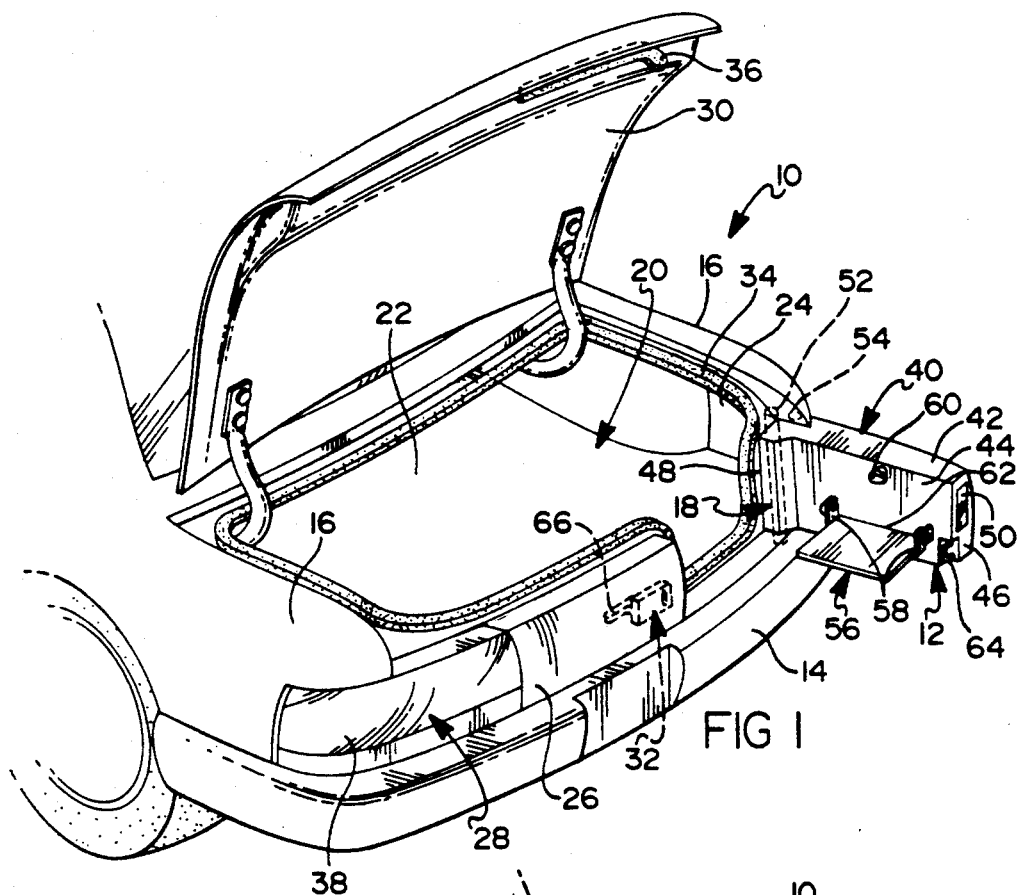
FIG. 1 is a perspective view showing the rear portion of a vehicle with the trunk lid open and equipped with a tail lamp assembly made according to the present invention and located in an open position.

Referring to the drawings, the present invention will now be described in detail with reference to the preferred embodiment.

FIG. 1 is a perspective view showing the rear end of a vehicle (10) incorporating a tail lamp assembly (12) made according to the present invention. The tail lamp assembly (12) is shown in an open position located directly above and adjacent to a rear bumper (14) of the vehicle (10) and is pivotally mounted to the rear of a vehicle's side body panel (16) through a hinge (18).

Figure 2:
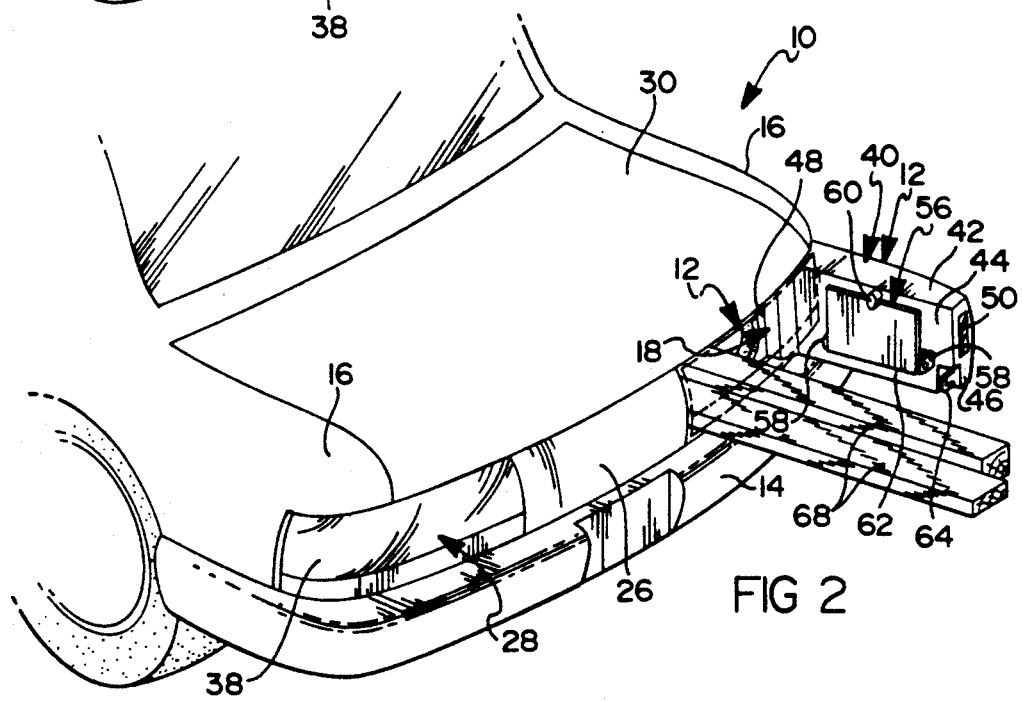
FIG. 2 is a view similar to that of FIG. 1 except that it shows, in full lines, the trunk lid closed with the tail lamp assembly in the open position and also shows, in phantom lines, the tail lamp assembly in the closed position.

As seen in FIG. 2, the tail lamp assembly (12) is pivotally movable between a closed position, as shown by the phantom lines, and the open position, as shown by the full lines. When the tail lamp assembly (12) is in the closed position, the tail lamp assembly (12) serves as a part of the vehicle (10) that helps define a trunk compartment (20) of the vehicle (10). In this regard, and as seen in FIG. 1, the trunk compartment (20) is defined by a floor (22), inner side walls (24) of each side body panel (16), a rear end panel (26), a fixed tail lamp assembly (28), the movable tail lamp assembly (12) when in the closed position, and a trunk lid (30) when closed. When in the closed position, the tail lamp assembly (12) is flanked on opposites sides by the rear end panel (26) and the side body panel (16) of the vehicle (10). When the trunk lid (30) is closed and the tail lamp assembly (12) is in the closed position, the tail lamp assembly (12) is located in horizontal alignment with the fixed tail lamp assembly (28) and, as is conventional, directly below and adjacent to the trunk lid (30). As will be more fully described hereinafter, a latch mechanism (32) is mounted on the inside surface of the rear end panel (26) to secure the tail lamp assembly (12) in the closed position. When the tail lamp assembly (12) is in the open position, it is positioned with its longitudinal axis substantially perpendicular to the rear end panel (26) of the vehicle (10) and substantially parallel with the plane of the side wall (24) of the vehicle's side body panel (16).

Due to the opening and closing feature of the tail lamp assembly (12), a primary seal (34) and a secondary seal (36) are provided to insure that water and dirt cannot enter the trunk compartment (20) when the trunk lid (30) is closed and the tail lamp assembly (12) is in the closed position. As seen in FIG. 1, the primary seal (34) follows the contour of the opening provided for the tail lamp assembly (12) and the trunk lid (30). The secondary seal (36) is attached to the underside edge of the trunk lid (30) and is adapted to contact the rear portion of the tail lamp assembly (12) where the edge of the trunk lid (30) and the tail lamp assembly (12) meet when the tail lamp assembly (12) is in the closed position.

In general, the tail lamp assembly (12) has an outer configuration that is a mirror image of the fixed tail lamp assembly (28) which contains an outer lens (38). The tail lamp assembly (12) includes a housing (40) which is "L" shaped when viewed from above and consists of a top wall (42), a rear wall (44), two end walls (46) and (48) and a bottom wall (not shown). A lens (not shown), similar to the lens (38) of the fixed tail lamp assembly (28), closes the front of the housing (40) and has a slight convex curvature so as to provide a continuous body line with the rear end panel (26) and the side body panel (16) of the vehicle (10) when the tail lamp assembly (12) is in the closed position. As in the case of the fixed tail lamp assembly (28), the housing (40) contains parabolic reflectors and lamps (not shown) which illuminate the lens of the tail lamp assembly (12) to provide to following vehicles a "stop light-turn signal" warning. In other words, when in the closed position, the "stop light-turn signal" warning is visible to following vehicles through the lens provided in the front wall of the housing (40), as well as through the lens (38) of the fixed tail lamp assembly (28). When the tail lamp assembly (12) is in the open position, the "stop light-turn signal" warning can be seen through a lens (50) mounted in the end wall (46) of the housing (40). The warning is given when the lamps, located within the housing (40), are energized upon application of the vehicle's brakes and or the vehicle's turn signal, respectively.

As seen in FIG. 1, the housing (40) is formed with an enlarged section at its inner end which is mounted to the vehicle (10) through the use of the hinge (18). This enlarged section of the housing (40) constitutes the short leg of the "L" shape configuration of the housing (40) previously described. The hinge (18) consists of a pivot pin (52) which is fixed with the vehicle (10) and allows the tail lamp assembly (12) to pivot about a substantially vertical axis between the closed position and the open position. A spring detent (54) is provided to maintain the tail lamp assembly (12) in the open position. Although the spring detent (54) can take other forms, the one employed in the housing (40) utilizes a spring loaded spherical ball that is partially encased in the housing (40) of the tail lamp assembly (12). A portion of the spherical ball is allowed to extend through an opening provided in the top wall (42) of the housing (40), and a spring, located directly under the spherical ball, provides an upward force against the spherical ball. Thus, when the tail lamp assembly (12) is pivoted outward to the open position, the spherical ball is depressed, due to the physical interference with the body panel (16) of the vehicle (10) until the spherical ball mates with a semicircular indentation provided on the underside of the body panel (16). The seating of the spherical ball in the indentation corresponds to the tail lamp assembly (12) being in the open position and provides a restraining force which must be overcome to move the tail lamp assembly (12) from the open position to the closed position. The aforementioned restraining force is great enough to maintain the tail lamp assembly (12) in the open position during operation of the vehicle (10).

The tail lamp assembly (12) also provides a foot rest (56) that is mounted to the rear wall (44) of the enclosure (40) through the use of a pair of horizontally aligned hinges (58). When not in use, the foot rest (56) is retained in an upward position and held against the rear wall (44) of the housing (40) by a retaining clip (60), as seen in FIG. 2. When use of the foot rest (56) is desired, the retaining clip (60) is turned to release the foot rest (56) allowing it to pivot downwardly from the position of FIG. 2 to the position seen in FIG. 1. When in the position in FIG. 1, the inside edge (62) of the foot rest (56) is supported against the rear wall (44) of the housing (40) and is perpendicular to the rear wall (44). The foot rest (56) is a thin rectangular plate made of a resilient material, such as plastic, to provide a foot rest that can be used for putting on and removing shoes, such as golf shoes which contain spikes on the soles of the shoes.

To secure the tail lamp assembly (12) to the rear end panel (26) of the vehicle (10), the latch mechanism (32) is provided, as aforementioned, in the assembly. The free or outer end of the housing (40) has a striker bolt (64), secured thereto, which cooperates with the latch mechanism (32) mounted inside the trunk compartment (20) on the inside surface of the rear end panel (26) as seen in FIG. 1. The lower inside corner of the housing (40), where the rear wall (44) and the end wall (46) of the housing (40) meet, is recessed to provide for the mounting of the striker bolt (64). The portion of the latch mechanism (32) receiving the striker bolt (64) extends slightly beyond the rear end panel (26) so as to receive and latch the striker bolt (64) when the housing (40) is pivoted inwardly from the open position to the closed position. The latch mechanism (32) is of the usual fork bolt design which is adapted to snap over the striker bolt (64) when the tail lamp assembly (12) is in the closed position thereby securing the tail lamp assembly (12) to the rear end panel (36). When it is desired to move the tail lamp assembly (12) to the open position, a lever (66) on the latch mechanism (32) is simply lifted, thereby releasing the striker bolt (64). The tail lamp assembly (12) is then free to pivot to the open position.

When the vehicle operator desires to have the tail lamp assembly (12) in the open position, the trunk lid (30) of the vehicle (10) is opened to gain access to the latch mechanism (32), and the lever (66) is lifted to release the striker bolt (64). The operator then pivots the tail lamp assembly (12) outwardly about the pivot pin (52) to the open position, and the aforementioned spring detent (54) maintains the tail lamp assembly (12) in the open position. Excessively long cargo, such as boards of lumber (68), can then be loaded into the trunk compartment (20) after which the trunk lid (30) can be closed. After the lumber (68) is removed, the tail lamp assembly (12) can be returned to the closed position by simply pivoting the tail lamp assembly (12) inwardly to the closed position causing the striker bolt (64) to engage the latch mechanism (32) thereby securing the tail lamp assembly (12) in the closed position. When closing the tail lamp assembly (12), it is unnecessary to have the trunk lid (30) open.

The foregoing description is of a preferred embodiment of the invention, and it will be understood by those of ordinary skill in the art that various modifications and changes may be made without departing from the scope of the invention as defined in the claims.

The embodiments of the invention in which an exclusive property or privilege is claimed are defined as follows:

1. A tail lamp assembly for a vehicle having a trunk compartment, said vehicle having parts thereof cooperating with said tail lamp assembly to define said trunk compartment, said tail lamp assembly comprising a self-contained housing having a pair of laterally spaced end portions, means connecting one of said end portions of said housing to said vehicle for allowing said housing to pivot outward from a closed position wherein said housing cooperates with said parts to define the trunk compartment and pivot to an open position wherein access is provided to said trunk compartment for the carrying of cargo that is longitudinally longer than said trunk compartment, and the other end of said portions having a lens mounted to therein so as to permit said tail lamp assembly to provide a stop light-turn signal warning to following vehicles when said tail lamp assembly is in said open position.

2. A tail lamp assembly for a vehicle having a trunk compartment as stated in claim 1, wherein the means connecting the housing to the vehicle comprises a pivot pin whereby said tail lamp assembly pivots about a substantially vertical axis about said pivot pin resulting in said tail lamp assembly being movable from said open position to said closed position.

3. A tail lamp assembly for a vehicle having a trunk compartment as stated in claim 1, wherein said tail lamp assembly is provided with a foot rest that can be utilized when said tail lamp assembly is in said open position.

4. A vehicle having a trunk compartment defined by a pivotally supported trunk lid, a pair of side walls, a floor portion, a rear end panel, a fixed tail lamp assembly, and a movable tail lamp assembly, said movable tail lamp assembly having a pair of laterally spaced end portions, means connecting one of said end portions of said movable tail lamp assembly to said vehicle for pivotable movement about a substantially vertical axis between a closed position wherein both said fixed and movable tail lamp assemblies cooperate with the trunk lid to provide an end wall for the trunk compartment, an open position wherein an opening is provided in the trunk compartment when the trunk lid is closed so that cargo having a length greater than the longitudinal length of the floor portion can be accommodated by the floor portion of the trunk compartment, locking means for securing said movable tail lamp assembly to the vehicle when said movable tail lamp assembly is in the closed position, and detent means for maintaining said movable tail lamp assembly in said open position.

5. A vehicle having a trunk compartment as stated in claim 4, wherein the means connecting one end portion of said movable tail lamp assembly to said vehicle comprises a pivot pin whereby said movable tail lamp assembly pivots on a substantially vertical axis about said pivot pin resulting in said movable tail lamp assembly being movable between said open position and said closed position.

6. A vehicle having a trunk compartment as stated in claim 4, wherein the locking means comprises a striker bolt mounted on the other end portion of said pair of end portions of said movable tail lamp assembly, a latch mechanism mounted on the rear end panel of the vehicle body to receive said striker bolt, and a latch release handle located inside the trunk compartment and cooperatively connected to the latch mechanism to release said striker bolt.

7. A vehicle having a trunk compartment as stated in claim 4, wherein the detent means comprises a spring detent for maintaining said movable tail lamp assembly in said open position.

8. A vehicle having a trunk compartment as stated in claim 4, wherein a lens is provided on said other end portion of said pair of end portions so as to provide a functional stop light and turn signal warning to following vehicles when said movable tail lamp assembly is in said open position.

9. A vehicle having a trunk compartment as stated in claim 4, wherein said movable tail lamp assembly is provided with a foot rest that can be utilized when said movable tail lamp assembly is in said open position.

10. A vehicle having a trunk compartment defined by a pivotally supported trunk lid, a pair of side walls, a floor portion, a rear end panel, a fixed tail lamp assembly, and a movable tail lamp assembly mounted to said vehicle by a hinge, said movable tail lamp assembly adapted to pivot about a substantially vertical axis provided by the hinge from a closed position wherein said movable tail lamp assembly cooperates with the fixed tail lamp assembly to provide an end wall for said trunk compartment to an open position wherein said movable tail lamp assembly provides an opening in the trunk compartment when the trunk lid is closed so that cargo having a length greater than the longitudinal length of the floor portion can be accommodated by the floor portion of the trunk compartment, a latch mechanism for securing the movable tail lamp assembly in said closed position, a spring detent to maintain said movable tail lamp assembly in said open position, and a foot rest pivotally supported by said movable tail lamp assembly for use when said movable tail lamp assembly is in said open position.

* * * * *